(12) United States Patent
Vuk et al.

(10) Patent No.: US 7,786,620 B2
(45) Date of Patent: Aug. 31, 2010

(54) BATTERY SUPPLEMENTING SUPER CAPACITOR ENERGY STORAGE CHARGE AND DISCHARGE CONVERTER

(75) Inventors: Ivan Vuk, Mississauga (CA); Hassan Ali Kojori, Mississauga (CA); Ileana Rusan, Toronto (CA)

(73) Assignee: Honeywell International Inc., Morristown, NJ (US)

( * ) Notice: Subject to any disclaimer, the term of this patent is extended or adjusted under 35 U.S.C. 154(b) by 172 days.

(21) Appl. No.: 12/032,506

(22) Filed: Feb. 15, 2008

(65) Prior Publication Data

US 2009/0206657 A1    Aug. 20, 2009

(51) Int. Cl.
*H02J 7/00* (2006.01)
*H02J 9/00* (2006.01)

(52) U.S. Cl. .......................................... 307/66; 307/9.1
(58) Field of Classification Search .................. 307/9.1, 307/48, 66
See application file for complete search history.

(56) References Cited

U.S. PATENT DOCUMENTS

| | | | |
|---|---|---|---|
| 5,850,113 A * | 12/1998 | Weimer et al. | ............... 307/125 |
| 6,169,389 B1 | 1/2001 | Chen | |
| 6,487,059 B2 | 11/2002 | Bontempo et al. | |
| 7,015,674 B2 | 3/2006 | VonderHaar | |
| 7,075,273 B2 | 7/2006 | O'Gorman et al. | |
| 7,109,686 B2 | 9/2006 | Schulte et al. | |
| 7,117,044 B2 | 10/2006 | Kocher et al. | |
| 7,143,298 B2 | 11/2006 | Wells et al. | |

* cited by examiner

*Primary Examiner*—Albert W Paladini
*Assistant Examiner*—Carlos Amaya
(74) *Attorney, Agent, or Firm*—Oral Caglar, Esq.

(57) ABSTRACT

A super capacitor energy storage supplementing a battery providing power to a direct current bus including charge and discharge converters is disclosed. A bank of super capacitors may be charged by a battery with a pulse-width modulation controller and an electromagnetic interference filter. The bank of super capacitors may be controllably connected to the direct current bus through an isolating transformer implemented as a isolated boost converter.

16 Claims, 9 Drawing Sheets

BATTERY SUPPLEMENTING SUPER CAPACITOR ENERGY STORAGE CHARGE AND DISCHARGE CONVERTER

BACKGROUND OF THE INVENTION

The invention relates to the field of aircraft electrical energy supply systems and more particularly to supplemental energy supplied to maintain consistent energy levels on an aircraft bus.

A DC bus line is typically maintained on an aircraft to supply energy to the electrical systems of the aircraft. An energy supplementary apparatus is connected to the DC bus line to keep the electrical systems operational during aircraft DC bus line transients or during peak short duration energy supply demand requirements by the load. The energy supplementary apparatus typically includes a two stage controlled charge and isolated boost utilizing closed loop regulators. The energy supplementary apparatus may be used in conjunction with aircraft battery supply.

Batteries are widely used to store electrical energy and may be used in energy supplementary apparatus. Batteries adequate to the high-power demands of aircraft electrical systems tend to be heavy and weight is usually a serious factor in aircraft design. Alternate energy storage elements such as super capacitors and electromechanical fly wheels may be used to provide energy for energy supplementary apparatus.

The large capacitance of super capacitors enables the storage of large amounts of energy that can be accessed at high currents. The charge deposit in a super capacitor or any capacitor, unlike most battery types, requires precise control of the capacitor's terminal voltage. The energy stored in a capacitor, being the square-low function of terminal voltage across the capacitor, dictates the use of power processing circuit that maintains a constant output voltage even during time varying voltage across the capacitor.

As can be seen, there is a need for an energy supplementary apparatus capable of providing sufficient energy levels while minimizing the battery capacity, size and weight requirement on a typical aircraft DC-bus distribution system

SUMMARY OF THE INVENTION

A super capacitor charge-discharge apparatus comprises a power source connected to a direct current bus. A super capacitor bank may be charged by the power source and may be controllably connected to the direct current bus. A control module may be connected to the super capacitor bank and may monitor a voltage of the direct current bus. The control module may provide signals to connect the super capacitor bank to the direct current bus when the monitored voltage is less than a predetermined level.

An aircraft power system comprises a power source connected to a direct current bus. An electrical system draws power from the direct current bus. A super capacitor bank may be charged by the power source and may be controllably connected to the direct current bus. A control module may monitor energy parameters of the direct current bus and connect the super capacitor bank to the direct current bus in response to the monitored energy parameters.

A method of providing supplemental energy to an aircraft energy system including a power source connected to a DC bus and a supplemental energy source may comprise the step of monitoring a voltage level of the DC bus and determining if the voltage level is below a threshold value. The supplemental energy source may be connected to the DC bus.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Aircraft, both commercial and military, as well as spacecraft typically use large and heavy batteries to store energy. The batteries may provide power for normal or emergency aircraft operations. In situations where the energy supply is stressed or unavailable, supplemental energy storage elements, such as super capacitors, may be used to augment or even temporarily replace the batteries and supply energy to microprocessors, memory banks, and other aircraft critical loads for a limited time.

The inclusion of a super-capacitor powered component as a supplement may allow the size and weight of batteries to be significantly reduced. A supplementary energy system may be implemented to control the process of supplying charge energy from a battery to a super-capacitor bank, the storage of supplemental energy in a super capacitor bank, and the transfer of isolated energy from the super capacitor bank to an aircraft bus supplementation apparatus.

A standard aircraft energy source, such as a battery, may be augmented with a supplemental energy system using a large capacitor or super capacitor for energy storage. The efficiency of the overall energy storage may be enhanced as the weight and physical size of the capacitor element may be significantly smaller than the size and capacity of battery storage required to provide equivalent energies. The system may include a battery, a super capacitor coupled in parallel to the battery, a super capacitor charging circuit or current limiter, and an isolated super capacitor to aircraft bus voltage step-up (boost) control circuit.

Figure 1:
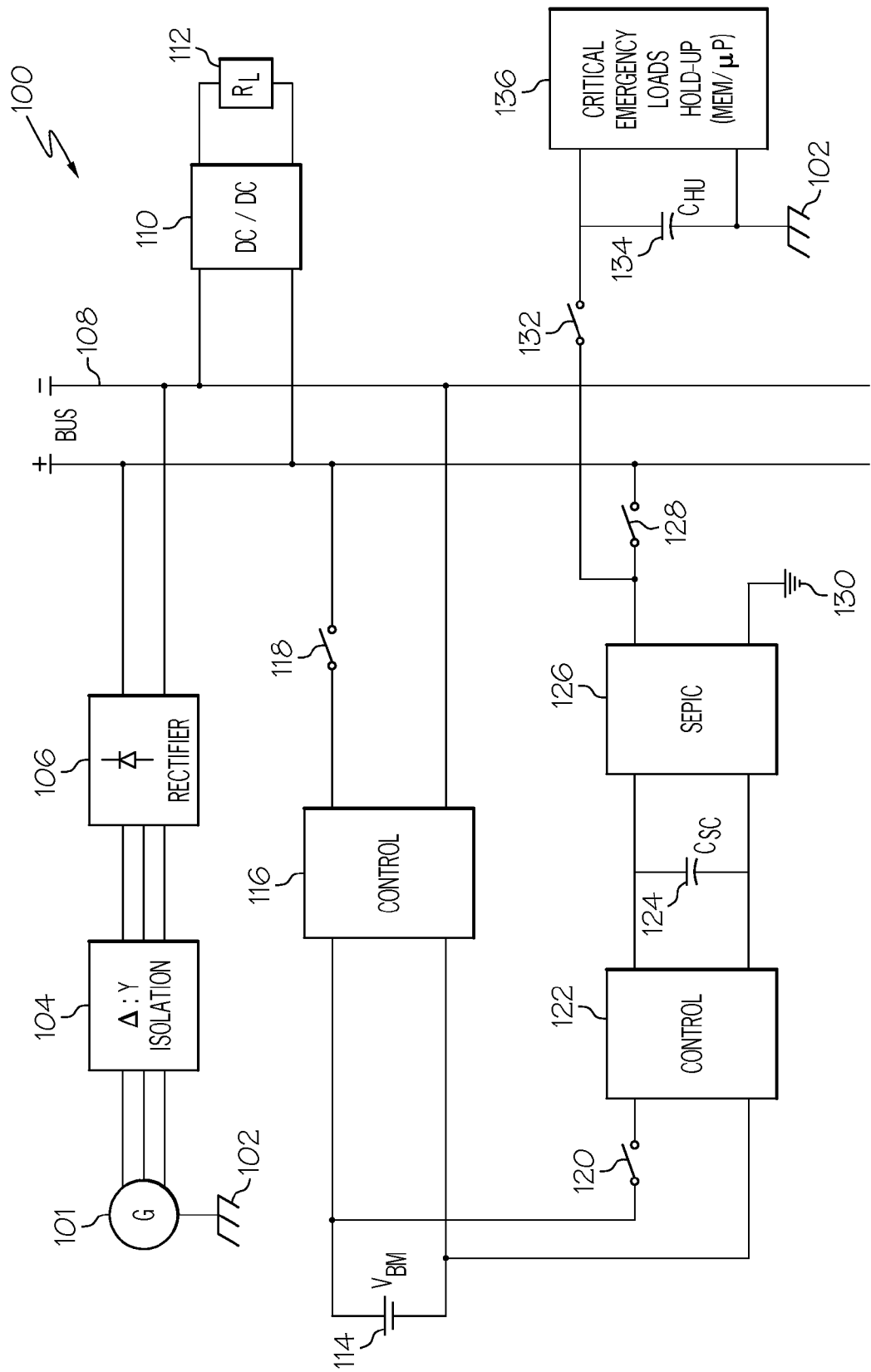
FIG. 1 is a block diagram depicting a DC bus system including an energy supplemental apparatus in accordance with an embodiment of the invention.

With reference to FIG. 1, a block diagram depicting an aircraft bus power distribution system 100 in accordance with an embodiment of the invention is shown. An aircraft bus power distribution system 100 typically provides 28 volts DC on a bus 108. The bus 108 may be powered by generator 101. The generator may be typically grounded 102 and isolated 104. The generator 101 may typically generate an alternating current that is converted to a direct current by rectifier 106.

Electrical systems may be characterized as a load resistance 112 receiving direct current energy from the bus through a DC converter 110, converting the voltage level of the bus 108 to a voltage appropriate to the load resistance 112.

Supplemental power may be supplied to the bus 108 from a battery 114 supplying energy at a voltage level Vbm. A main battery charge/discharge control module 116 may monitor the voltage level of the bus 108. When the voltage level of the bus 108 is reduced below a predetermined minimum, the main battery charge/discharge control module 116 may close switch 118 to connect the battery 114 to the bus 108.

A super capacitor 124 may be charged by the battery 114. Charging the super capacitor 124 may be controlled by super capacitor control module 122. The super capacitor control module 122 may monitor the charge level of the super capacitor 124. When the charge level of the super capacitor 124 falls below some predetermined level, the super capacitor control module 122 may close switch 120 to connect the super capacitor 124 to the battery 114.

The charged super capacitor 124 may be connected to the bus 108 to provide supplemental power, as required. A super capacitor control module 126 may monitor the voltage level of the bus 108. When the voltage level of the bus 108 falls below some predetermined level, the super capacitor single-ended primary inductor converter (SEPIC) control module 126 may close switch 128 and connect the super capacitor 124 to the bus 108.

Some electrical systems on the aircraft, such as microprocessors and memory units, may perform functions critical to the operation of the aircraft. These electrical systems may be represented as critical emergency loads having a separate hold-up system 136. The critical emergency loads hold-up system 136 may receive supplemental power from a hold-up capacitance 134. The super capacitor SEPIC control module 126 may monitor the charge level of the hold-up capacitance 134. When the charge level of the hold-up capacitance 134 falls below a predetermined level, the super capacitor SEPIC control module 126 may close switch 132 connecting the super capacitor 124 to the hold-up capacitance 134.

The super capacitor SEPIC control module 126 may be relatively grounded 130, essentially connected to the bus 108 and the ground connection 102 of the hold-up capacitance 134.

Figure 2:
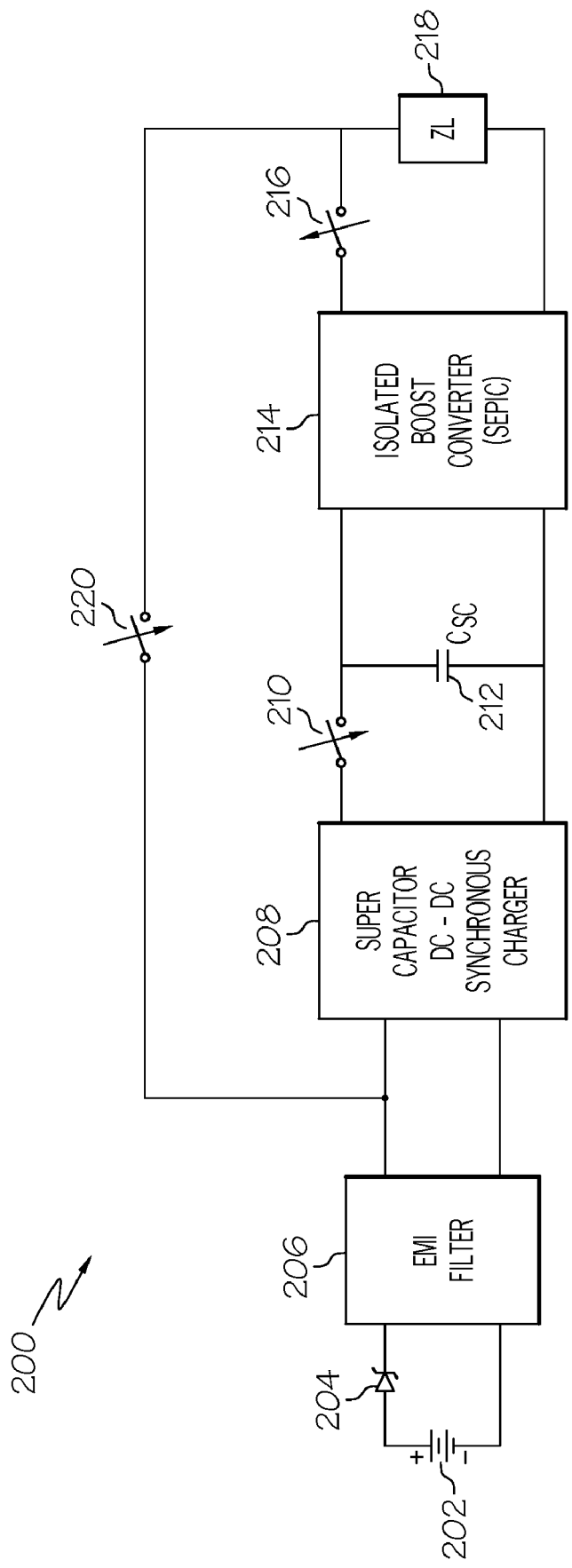
FIG. 2 is a block diagram depicting a DC bus system in a normal operating mode, in accordance with an embodiment of the invention.

With reference to FIG. 2, a block diagram depicting a DC bus battery supplemented aircraft power system 200 in accordance with an aspect of the invention is shown. The supplemented power system 200 is represented in a super capacitor charger mode of operation with a source disconnecting switch 210 and a converter bypass switch 220 closed and load disconnecting switch 216 may be open. An electromagnetic interference (EMI) filter 206 may be connected to a battery 202 through diode 204. The EMI filter 206 may provide noise suppression function while the supplemented power system 200 is in a charging mode, suppressing pulse width modulation (PWM) switching spikes resulting from DC-DC conversion. Diode 204 may be a Schottky diode, and may provide reverse leakage blocking capability in the event the voltage of the super capacitor 212 exceeds voltage of the battery 202. The diode 204 may be replaced with an electromechanical switch in some applications. The aircraft DC-bus 108 may also be used, in another embodiment, to charge super capacitor 212. Alternatively, an aircraft generator/alternator 101 or any rotating machine energy source may charge super capacitor 212.

With converter bypass switch 220 closed, the battery 202 may provide energy to load 218. A super capacitor DC-DC synchronous charger 208 may receive energy from the EMI filter 206. When the charge stored on super capacitor 212 falls below a predetermined level, the source disconnecting switch 210 may be closed and the super capacitor DC-DC synchronous charger 208 may be connected to the super capacitor 212 and charged. An isolated boost converter 214 may disconnect the load 218 from the super capacitor 212 by opening load disconnecting switch 216.

In charge mode, a current flow from the battery 202 to super capacitor may be controlled with a DC-DC synchronous charger 208 using either current mode or voltage mode control, depending on the state of voltage level across the super capacitor.

Figure 3:
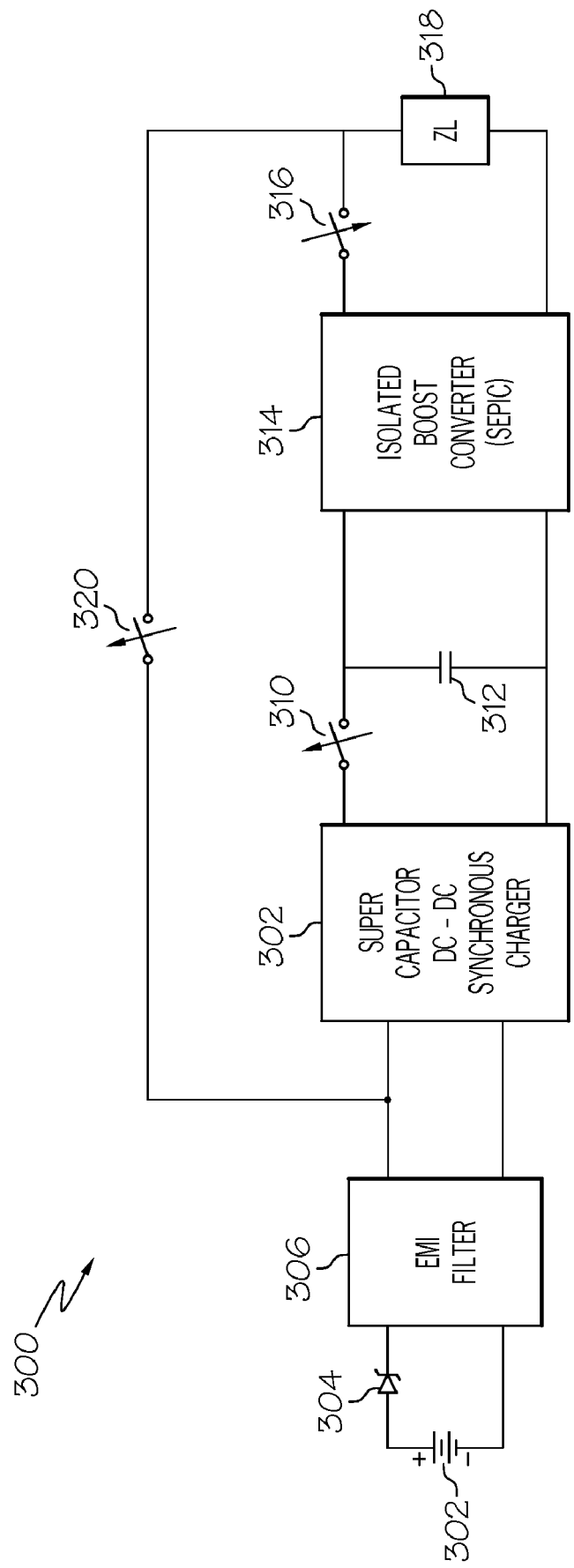
FIG. 3 is a block diagram depicting a DC bus system in a supplemental mode, in accordance with an embodiment of the invention.

With reference to FIG. 3, a block diagram depicting a DC bus battery supplemented aircraft power system 300 in accordance with an aspect of the invention is shown. The supplemented power system 300 is represented in a super capacitor discharge mode with source disconnecting switch 310 and converter bypass switch 320 are open and load disconnecting switch 316 is closed. In this mode, an isolated boost converter 314 may transfer energy stored in a super capacitor 312 to the load 318.

The battery 302, diode 304, EMI filter 308 and super capacitor DC-DC synchronous charger 308 may be disconnected from the super capacitor 312 and load 318 by the open source disconnecting switch 310 and open converter bypass switch 3200 when the supplemented power system 300 is in super capacitor discharge mode. An isolated boost converter 314 may connect the super capacitor 312 to the load 318 by closing the load disconnecting switch 316.

Figure 4:
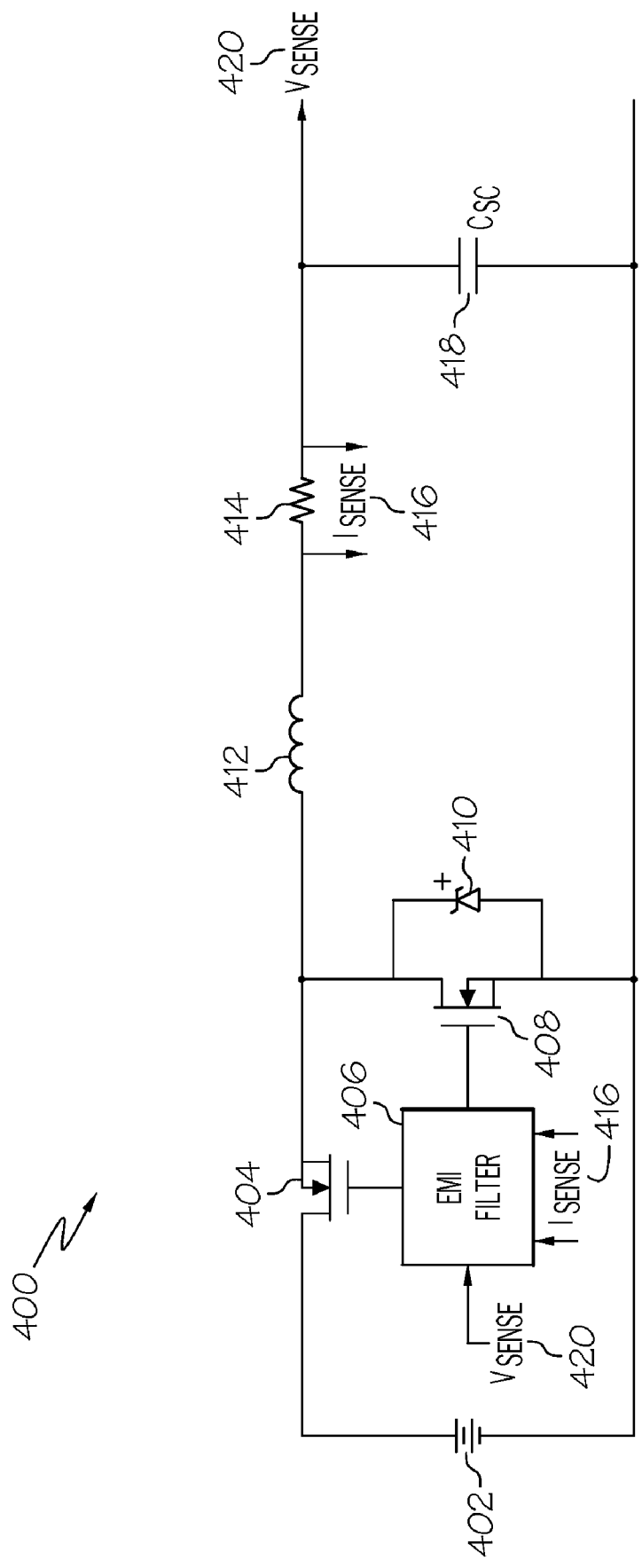
FIG. 4 is a schematic diagram depicting a synchronous converter in accordance with an embodiment of the invention.

With reference to FIG. 4, a block diagram depicting super capacitor charging system 400 in accordance with an embodiment of the invention is shown. In this super capacitor charging system 400 a pulse width modulation (PWM) type synchronous buck converter is implemented to charge the super capacitor 418. A negative-type field effect transistor (N-FET) 408 may connect between the battery 402 and super capacitor 418 leads to reduce converter switching power losses. A Schottky diode 410 across the N-FET 408 may improve efficiency during transistor dead time. A pulse width modulation controller 406 may be any suitable discrete or integrated circuit device. The pulse width modulation controller 406 may connect the battery 402 to a super capacitor 418 with a switch 404, such as an FET, to charge the super capacitor 418. An inductance 412 may connect the switch 404 to the super capacitor 418 to reduce transient variations in the supplied current. A resistance 414 may provide a measure of the supplied current 416. The sense voltage 420 across the super capacitor 418 may be measured. The pulse width modulation controller 406 may be configured to operate in either current mode, using the measured current 416, or voltage mode, using the measured sense voltage 420, as feedback.

Figure 5:
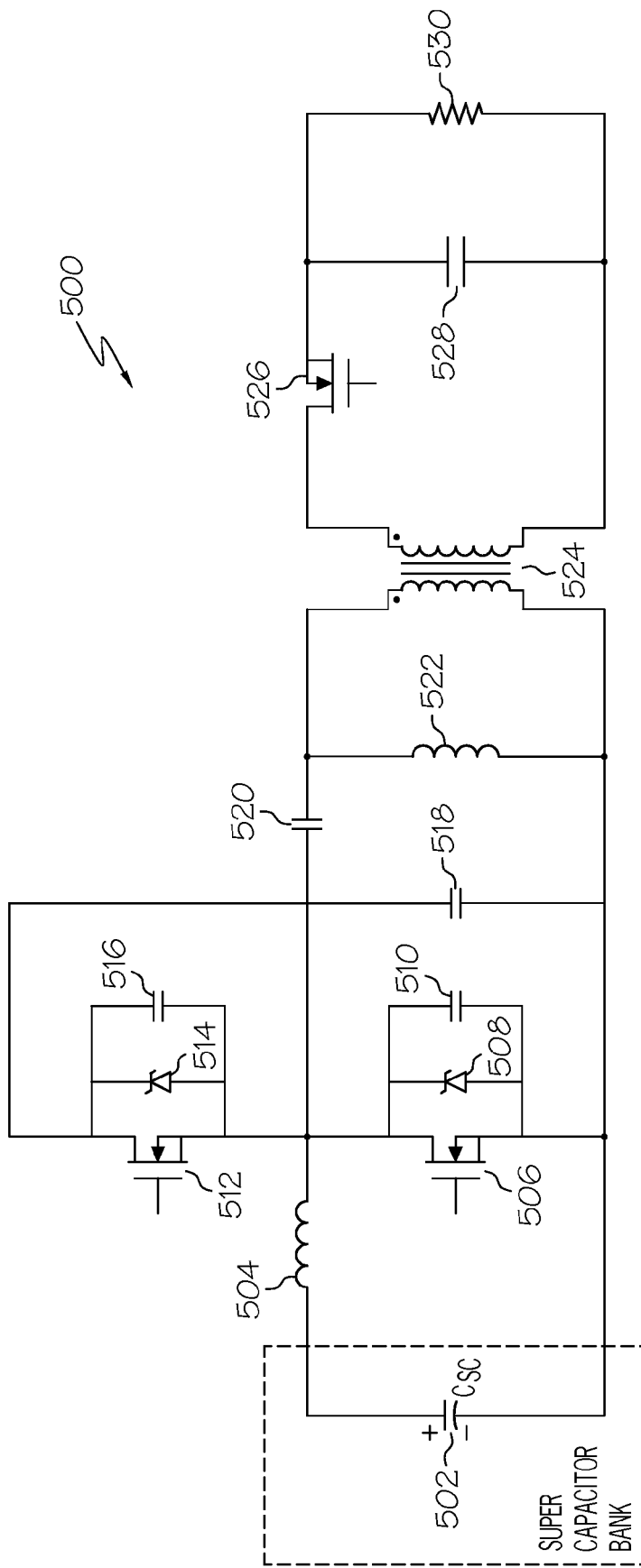
FIG. 5 is a schematic diagram depicting an active clamp single-ended primary inductor converter (SEPIC), in accordance with an embodiment of the invention.

With reference to FIG. 5, a block diagram depicting a supplemented power system 500 in accordance with an embodiment of the invention is shown.

The supplemented power system 500 may include an active clamp and synchronous secondary side rectifier circuit to minimize power conduction and switching losses. An isolating transformer 524 may transfer energy from a super capacitor bank 502 to the load 530. An inductance 504 may connect the super capacitor bank 502 to switches 512 and 506 connected in opposite polarity. Switch 506 may be an FET connected in parallel with a Schottky diode 508 and a capacitor 510. Switch 512 may be an FET connected in parallel with a Schottky diode 514 and a capacitor 514 and connected in series with a capacitor 518. A capacitor 520 may connect the inductor 504 to isolating transformer 524. An inductor 522 may be connected in parallel to the isolating transformer 524.

The isolating transformer 526 may connect to the load 530 through a switch 526. The switch 526 may be an FET. A capacitance 528 may be connected parallel to the load 530.

Figure 6:
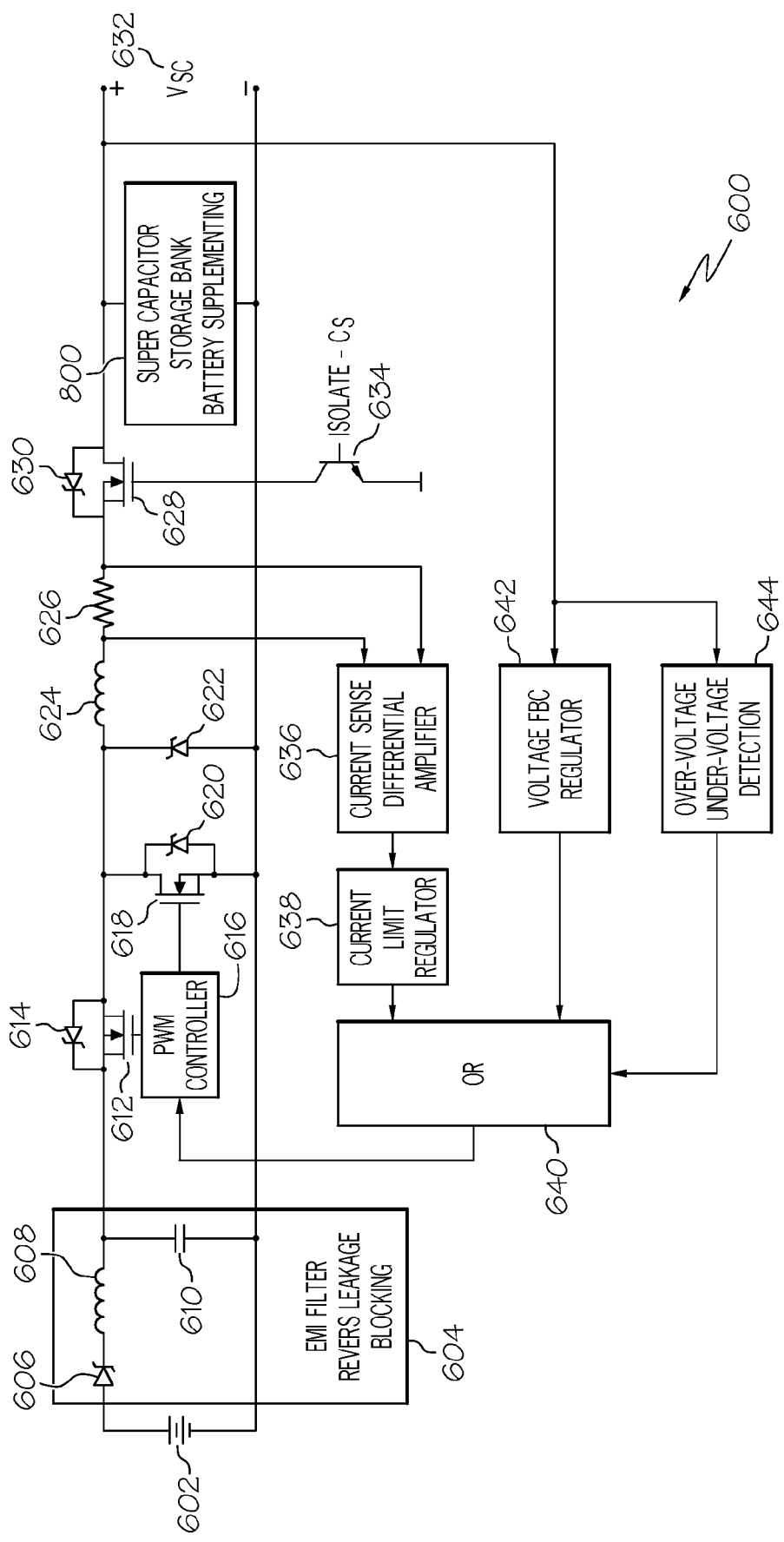
FIG. 6 is a block diagram depicting an energy supplementary apparatus in charge mode, in accordance with an embodiment of the invention.

With reference to FIG. 6, a block diagram depicting a super capacitor battery complementary DC-DC synchronous charger 600 in accordance with an embodiment of the invention is shown. A battery 602 may provide DC energy through an EMI Filter 604 having reverse leakage blocking. A capacitance 610 and inductance 608 may form the electromagnetic interference filtering and a diode 606 may block reverse leakage. A pulse-width modulation controller 616 may be a switching regulator operating as a current-mode, constant power source converter. Output current may be sensed via a current sense resistor 626. The output current may be amplified and filtered by current sense differential amplifier 636. The output of differential amplifier 636 may be fed to a current limit regulator 638. An output voltage 632 may be sensed, scaled down and isolated before being filtered and dynamically corrected by a voltage feedback regulator 642.

The pulse-width modulation controller 616 may receive a feedback signal from an 'OR' block 640 and may regulate current or voltage according to super capacitor charging profile. Over-voltage and under-voltage regulation circuitry 644 may inhibit the PWM controller 616 until a fault is cleared. The power provided by the battery 602 may be isolated from the super capacitor bank 800 with an isolation signal to switch 634, thus disabling or disconnecting the super capacitor bank 800 from the power source 602 using switch 628. Back currents may be blocked by a diode 630.

The pulse-width modulation controller 616 may control the state of a first switch 612, connecting the power source 602 to the super capacitor bank 800. Back currents across the first switch 612 may be blocked with diode 614. The pulse-width modulation controller 616 may control the state of a second switch 618 across the terminals of the super capacitor bank 800 and the power source 602. Back currents may be blocked by a diode 620. A diode 622 may further block back currents between the terminals of the super capacitor bank 800 and the power source 602. An inductance 624 may reduce transients in the currents supplying the super capacitor bank.

Figure 7:
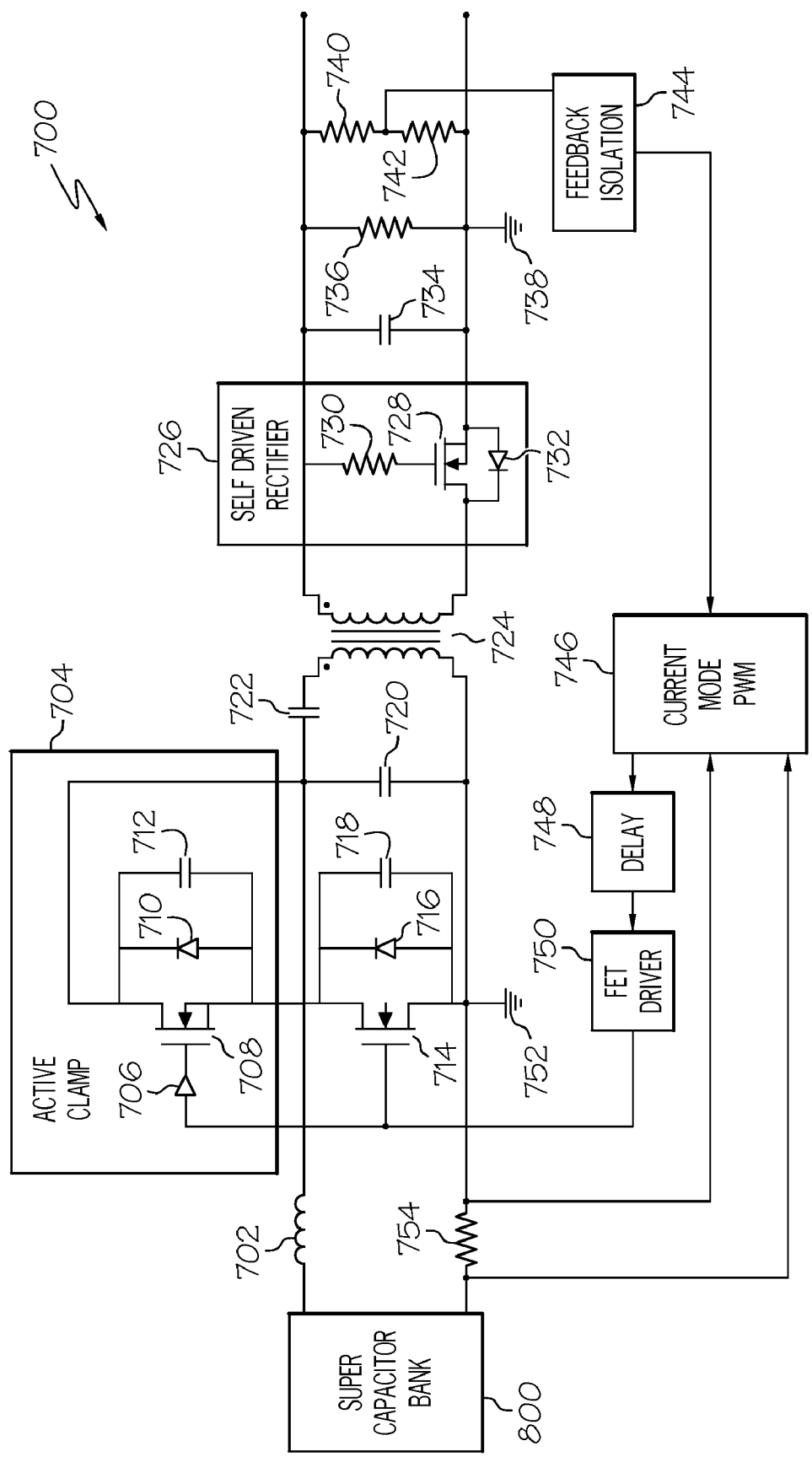
FIG. 7 is a block diagram depicting an energy supplementary apparatus in energy transfer mode, in accordance with an embodiment of the invention.

With reference to FIG. 7, a block diagram depicting a SEPIC converter control 700 in accordance with an embodiment of the invention is shown. The SEPIC converter control 700 may provide battery supplemental energy transfer capability to an aircraft DC bus (not shown) with full isolation from the primary side, thus increasing system safety, and improving EMI and common mode requirements.

An active voltage clamp 704 may include a switch 708 to improve switching losses and simultaneously limit the peak voltage stress on a main transistor 714. Zero-voltage or soft-switching may control the switches 708, 714 to curtail switching losses.

Output voltage may be sensed via a resistor divider network including resistors 740, 742. The sensed voltage may be isolated with an isolator 744. A current reference signal may be measured across resistance 754. The isolated voltage and current reference signal may be provided to a current loop comparator 746 which may output a pulse-width modulation pulse. The pulse-width modulation pulse may be processed by delay logic 748 to control switches 714, 708 with an FET driver 750. Switches 714, 708 may be configured in a hall-bridge and driven using a commercially available FET driver 750. An inductance 702 may reduce transients in the currents from the super capacitor bank 800. Capacitances 720, 722 may help prevent voltage transients. An inverter 706 may prevent back currents from switch 708. A diode 710 and capacitance 712 may control back currents at switch 708. A diode 710 and capacitance 718 may control back currents at switch 714. Switch 714 may be grounded 752. Isolation transformer 724 may isolate the energy from the super capacitor bank 800. A self-driven rectifier 726 may be formed with a resistance 730 and switch 728. A diode 732 may block back currents across switch 732. A capacitance 734 may block transient voltages. A resistance 736 may be grounded 738 across the output voltage.

Figure 8:
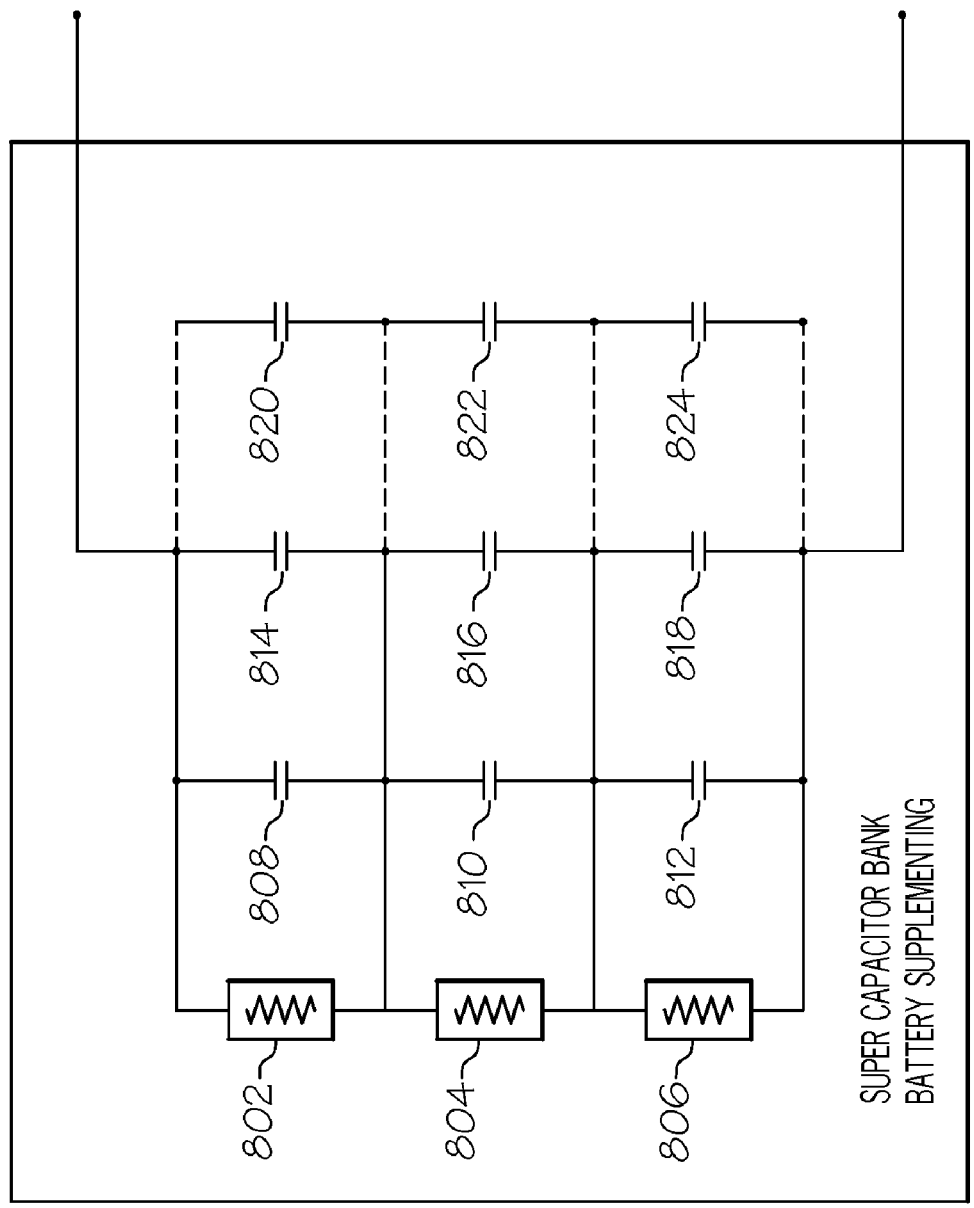
FIG. 8 is a circuit diagram depicting a super capacitor bank in accordance with an embodiment of the invention.

With reference to FIG. 8, a circuit diagram depicting a super capacitor bank 800 in accordance with an embodiment of the invention is shown. The super capacitor bank 800 may include an array of super capacitors 808, 810, 812, 814, 816, 818, 820, 822, 824. The array may include any appropriate number of super capacitors, where the appropriate number may be determined with reference to the voltage and currents needed by the electrical systems of the aircraft and the types of emergencies predicted. Resistances 802, 804, 806 may be used to control the voltage levels provided by the super capacitors 808, 810, 812, 814, 816, 818, 820, 822, 824.

Figure 9:
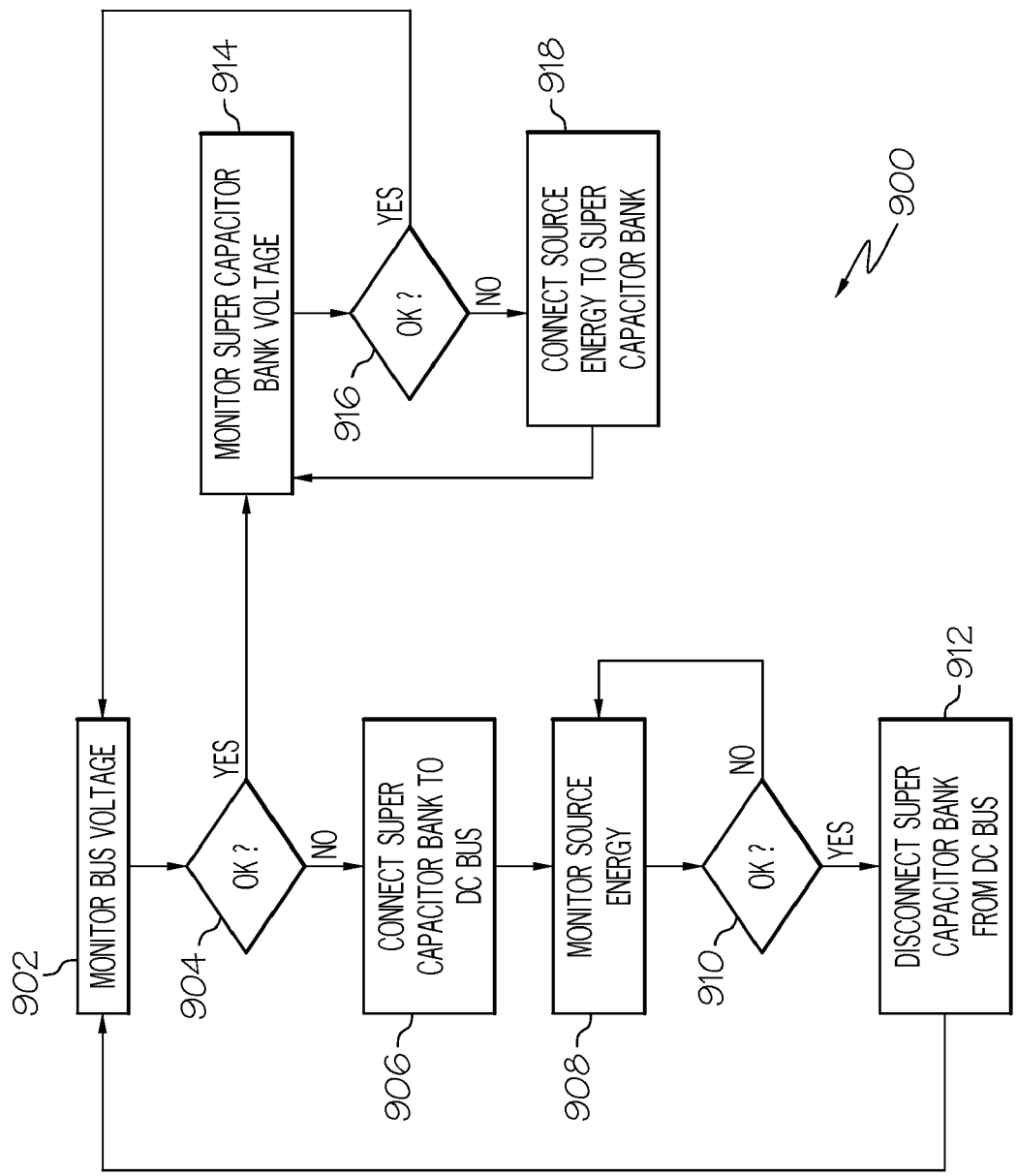
FIG. 9 is a flow chart depicting a process of providing supplemental energy in accordance with an embodiment of the invention.

With reference to FIG. 9, a flow chart depicting a process 900 of providing supplemental energy in accordance with an embodiment of the invention is shown. The aircraft power system 100 may monitor the voltage level of a DC bus 108 at function block 902. The process may determine if the voltage levels are appropriate at decision block 904. If the voltage level is below an acceptable level, the process may follow the NO path and may proceed to function block 906. The super capacitor bank 124 may be connected to the DC bus 108. The voltage level of the energy source 101 may be monitored at function block 908. The source energy readiness may be determined at decision block 910. While the source energy 101 remains insufficient, the process may follow the NO path and may continue monitoring the source energy 101 at function block 908. When the source energy is restored, the process may follow the YES path and may disconnect the super capacitor bank 124 from the DC bus 108. The process may return to function block 902 and may monitor the DC bus voltage. Where the DC bus voltage is acceptable at decision block 904, the process may follow the YES path and may monitor the super capacitor bank voltage at function block 914. The process may determine if the super capacitor bank voltage is acceptable at decision block 916. Where the super capacitor bank voltage is acceptable, the process may follow the YES path and may return to function block 902. Where the super capacitor bank voltage is below threshold, the process may follow the NO path and may connect the battery 114 to the super capacitor bank 124 at function block 918. The process may return to function block 914 and may monitor the super capacitor bank voltage during charging.

It should be understood, of course, that the foregoing relates to exemplary embodiments of the invention and that modifications may be made without departing from the spirit and scope of the invention as set forth in the following claims.

We claim:

1. A super capacitor charge-discharge apparatus comprising:
    a power source connected to a direct current bus;
    a super capacitor bank charged by said power source and controllably connectable to said direct current bus;
    a control module connected to said super capacitor bank and monitoring a voltage of said direct current bus, said control module providing signals to indirectly connect said super capacitor bank to said direct current bus when said voltage is less than a predetermined level; and
    an active clamp and synchronous side rectifier circuit for minimizing power conduction and switching losses comprising:
        an isolating transformer for transferring energy from the supercapacitor bank to direct current bus;
        first and second solid-state switches connected in opposite polarity;
        an inductor connecting the first and second switches with the super capacitor bank; and
        a capacitor connecting the inductor to the isolating transformer.

2. The apparatus of claim 1, wherein the active clamp and synchronous side rectifier circuit further comprises a third solid state switch interposed between the isolating transformer and the direct current bus.

3. The apparatus of claim 1, further comprising leakage blocking connected to said super capacitor bank.

4. The apparatus of claim 1, further comprising transient protection connected to said power source.

5. The apparatus of claim 1, further comprising an electromagnetic interference filter connected to said power source and filtering power provided from said power source to said super capacitor bank.

6. The apparatus of claim 1, wherein said control module is a pulse-width modulation controller operated with sensed current feedback.

7. The apparatus of claim 1, wherein said control module is a pulse-width modulation controller including over-current load protection.

8. An aircraft power system comprising:
    a power source connected to a direct current bus;
    an electrical system drawing power from said direct current bus;
    a super capacitor bank charged by said power source and controllably connectable to said direct current bus;
    a super capacitor single-ended primary inductor converter (SEPIC) control module monitoring energy parameters of said direct current bus and indirectly connecting said super capacitor bank to said direct current bus in response to monitored energy parameters which control module comprises:
        a main transistor;
        an active voltage clamp for limiting peak voltage stress on the main transistor;
        an isolation transformer having its primary connected with the supercapacitor bank;
        a self-driven rectifier connected with a secondary of the isolating transformer; and
        a current loop comparator connected to provide control signals to the main transistor for controlling current output from the supercapacitor bank.

9. The aircraft power system of claim 8 wherein said power source comprises a battery.

10. The aircraft power system of claim 8 wherein said super capacitor bank comprises an array of super capacitors.

11. The aircraft power system of claim 8 wherein said power source is connected to said super capacitor bank through an electromagnetic interference filter.

12. A method of providing supplemental energy to an aircraft energy system including a power source connected to a DC bus and a supplemental energy source, the method comprising:
    monitoring a voltage level of the DC bus;
    determining if said voltage level is below a threshold value;
    connecting said supplemental energy source to a primary side of an isolating transformer through a main transistor;
    employing an active voltage clamp to limit peak voltage stress on the main transistor;
    measuring an output voltage signal on a secondary side of the isolating transformer;
    isolating the output voltage signal to produce an isolated voltage signal;
    monitoring a current reference signal at an output of the supplemental energy source;
    producing pulse-width modulation (PWM) signals responsively to the isolated voltage signals and the current reference signals; and
    controlling current from the supplemental energy source with the PWM signals so that the supplementary energy is applied to the DC bus with increased system safety.

13. The method of claim 12, wherein said supplemental energy source comprises a capacitance.

14. The method of claim 13, wherein said capacitance comprises a plurality of super capacitors.

15. The method of claim 12 further comprising determining if a voltage level is above a threshold charge value and connecting said supplemental energy source to a charging power source.

16. The method of claim 12 further comprising charging said supplemental energy source.

* * * * *